United States Patent [19]

Tanaka et al.

[11] Patent Number: 5,424,407
[45] Date of Patent: Jun. 13, 1995

[54] CROCETIN-CONTAINING COLORING

[75] Inventors: Takemi Tanaka; Hisashi Okemoto; Nobuhiro Kuwahara, all of Yokohama, Japan

[73] Assignee: Ensuiko Sugar Refining Co., Ltd., Yokohama, Japan

[21] Appl. No.: 156,810

[22] Filed: Nov. 22, 1993

[30] Foreign Application Priority Data

Feb. 25, 1993 [JP] Japan ................... 5-059422

[51] Int. Cl.$^6$ ............... C08B 37/16; C08B 30/12; A23L 1/27; A23G 3/00
[52] U.S. Cl. ................... 536/4.1; 536/103; 127/32; 426/268; 426/270; 426/658; 426/661
[58] Field of Search ........... 536/4.1, 103; 127/32; 426/268, 270, 658, 661

[56] References Cited

U.S. PATENT DOCUMENTS 5,043,326 8/1991 Stadler et al. ............ 536/103

FOREIGN PATENT DOCUMENTS 0200043 11/1986 European Pat. Off. .
60-45229 10/1985 Japan .
4-153271 5/1992 Japan .

OTHER PUBLICATIONS

Patent Abstracts of Japan, vol. 16, No. 437, Sep. 1992, of JP-A-04 153 271, 26 May 1992.
Database WPI, Week 7943, Derwent Publications Ltd., London, GB; AN 77949B, 'Stabilisation of natural pigment by addition of cyclodextrin and opt. reducing agent' of JP-B-60 045 229 (Kawashima F.) 8 Oct. 1985.

*Primary Examiner*—Nathan M. Nutter
*Attorney, Agent, or Firm*—Frishauf, Holtz, Goodman & Woodward

[57] ABSTRACT

A stabilized crocetin-containing colorant which has as an effective component a crocetin included by cyclodextrin. This colorant is imparted with resistance against light and various chemicals to crocetin, which is a hydrolysate of crocin, the main component of the carotenoid gardenia yellow pigment. The colorant may be added to various food products for use of crocetin as a stable coloring matter.

8 Claims, 2 Drawing Sheets

□ Crocetin
+ Crocetin/α-CD Inclusion Complex
◇ Crocetin/β-CD Inclusion Complex
△ Crocetin/γ-CD Inclusion Complex
× Crocetin/K-50 Inclusion Complex
▽ Crocetin/K-100 Inclusion Complex □ Crocetin
+ Crocetin/α-CD Inclusion Complex
◇ Crocetin/β-CD Inclusion Complex
△ Crocetin/γ-CD Inclusion Complex
× Crocetin/K-50 Inclusion Complex
▽ Crocetin/K-100 Inclusion Complex

CROCETIN-CONTAINING COLORING

FIELD OF THE INVENTION

The present invention relates to a crocetin-containing colorant, and specifically it relates to a crocetin-containing colorant which has been stabilized by forming an inclusion complex with cyclodextrin. Crocetin is a derivative of a yellow pigment found in plants such as gardenia and the like, and according to the present invention it is stabilized to widen the range of its use as a colorant.

DESCRIPTION OF THE PRIOR ART

A method is known for stabilizing gardenia pigment (crocin) by its inclusion complex with cyclodextrin (Japanese Patent Publication No. 60-45229), but no method has been heretofore known for the stabilization of crocetin for its use as a pigment, which is an object of the present invention.

Crocetin is a hydrolysate of crocin, the main component of the carotenoid gardenia yellow pigment, and it is particularly unstable with respect to light and chemicals. Methods have been proposed to improve its properties, such as adding low concentrations of ascorbic acid thereto, but the methods of use thereof are placed under strict control, and furthermore at present satisfactory results cannot be obtained.

SUMMARY OF THE INVENTION

An object of the present invention is to impart to crocetin resistance against light and chemicals for its stability, thus providing a method for its use as a colorant.

DETAILED DESCRIPTION OF THE INVENTION

The present invention relates to a crocetin-containing colorant having as an effective component a crocetin included by cyclodextrin.

Crocetin is obtained by hydrolyzing crocin, which is extracted from the above mentioned plant, but commercially available products (for example, products of Sigma, Inc.) may be used.

Also, cyclodextrin (hereunder sometimes abbreviated to "CD") is a cyclic oligosaccharide with a polymerization degree of 6-8 which is obtained by allowing cyclodextrin glucanotransferase (CGTase, EC 2.4.1.19) to act on starch or a hydrolysate thereof, and specific examples thereof include $\alpha$-, $\beta$-, $\gamma$-CD and mixtures thereof, or mixtures of these and dextrin. According to the present invention, $\alpha$-CD alone and substances containing it are particularly suitable.

A crocetin-containing colorant according to the present invention may be obtained in the following manner.

First, a prescribed amount of crocetin which has been dissolved in an alkaline solution containing sodium hydroxide, etc. is added to CD, particularly $\alpha$-CD, which has been kneaded into a paste form with a small amount of water, and the mixture is vigorously stirred. The amount of water used is enough to form a stirrable paste, and in the case of $\alpha$-CD, it may be added so that the solid concentration is about 40–60%. The stirring time will depend on the degree of stirring, but it is 10 minutes to 3 hours, and normally 60 minutes or more, and stirring may be effected while cooling so that the temperature does not rise too much over 80° C.

After completion of the stirring, the pasty pigment which exists as an inclusion complex with CD is subjected to centrifugal separation (7,900×G, 10 minutes, room temperature) to separate the non-included pigment. The precipitated portion obtained upon centrifugal separation is called a crocetin included by CD (hereunder sometimes shortened to "crocetin/CD inclusion complex") and this is used as the colorant according to the present invention.

EXAMPLES

A detailed description of the present invention will now be provided with reference to the Examples.

Test Example 1

One part by weight of crocetin dissolved in 0.1M sodium hydroxide was added to 10 parts by weight of $\alpha$-CD 10 which had been prepared into a paste form with a small amount of water, and the mixture was vigorously stirred for 60 minutes and then subjected to centrifugal separation to obtain a crocetin/$\alpha$-CD inclusion complex.

This crocetin included by $\alpha$-CD, $\beta$-CD, a mixture of $\alpha$-, $\beta$- and $\gamma$-CD (trade name: K-100, product of Ensuiko Sugar Refining Co., Ltd.), or a mixture of $\alpha$-, $\beta$-, $\gamma$-CD and dextrin (trade name: K-50, product of Ensuiko Sugar Refining Co., Ltd.) and unprocessed crocetin were each dissolved in a McIlvaine buffer solution (pH 7) containing 20% ethanol which had been diluted to 1/10 so that the absorbance at 420 nm and 450 nm was 0.4–0.8, to prepare test solutions.

Figure 1:
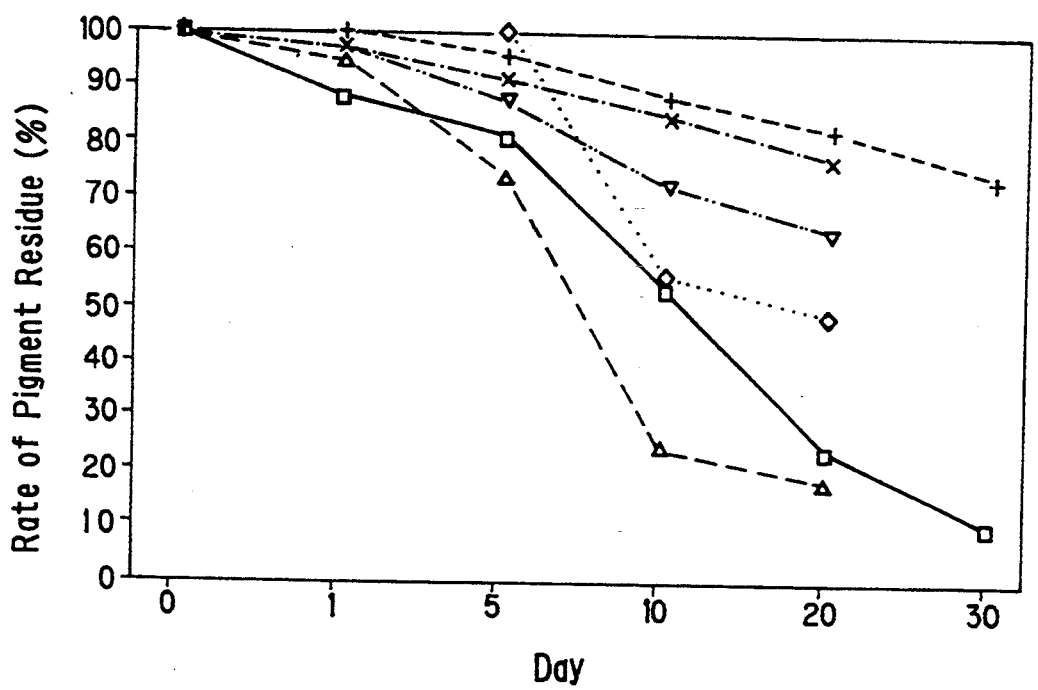
FIG. 1 is a graph showing the results of a light fastness test against fluorescent light.

A pre-determined amount of each of the test solutions was poured into a glass test tube and allowed to stand at room temperature under a fluorescent lamp at 900 lux, and the absorbance and the color difference were measured with time. The results are shown in FIG. 1. As is clear from the figure, crocetin faded upon exposure to fluorescent light, but the fading was considerably suppressed with crocetin/$\alpha$-CD inclusion complex, crocetin/$\beta$-inclusion complex, crocetin/K-50 inclusion complex and crocetin/K-100 inclusion complex.

Test Example 2

Figure 2:
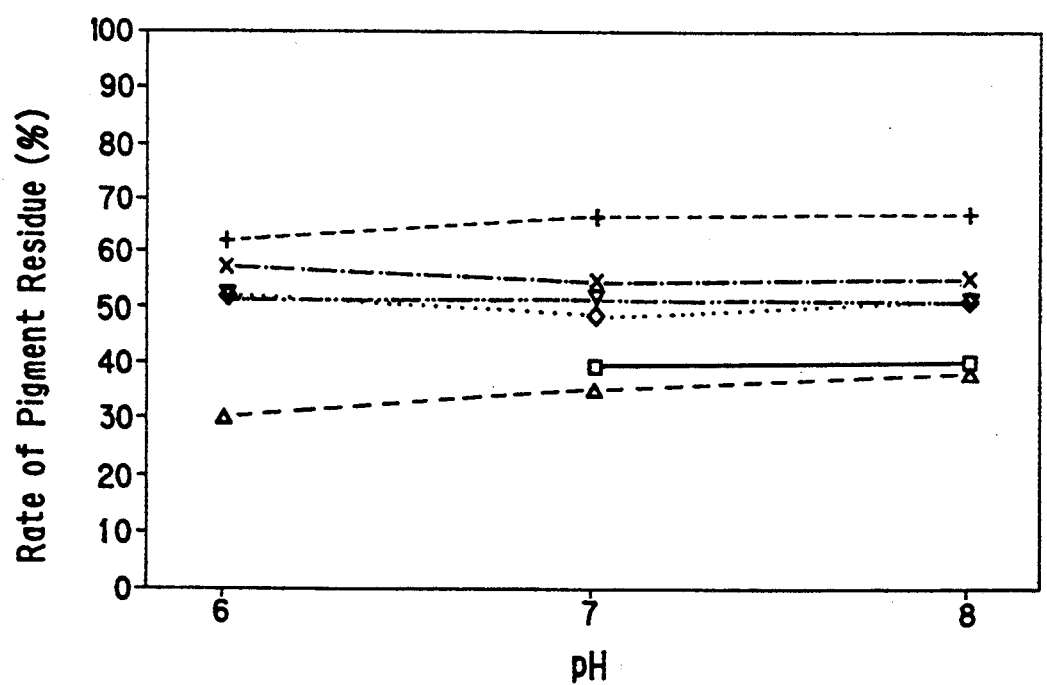
FIG. 2 is a graph showing the results of a light fastness test against ultraviolet light.

The test solutions in Test Example 1 were poured onto Petri dishes, the pH thereof was adjusted, they were allowed to stand uncovered under 256 nm ultraviolet light (30 cm from the light source), and the absorbance was measured with time. The results are shown in FIG. 2. As is clear from the figure, crocetin faded under ultraviolet light, but the fading was considerably suppressed with crocetin/$\alpha$-CD inclusion complex, crocetin/$\beta$-CD inclusion complex, crocetin/K-50 inclusion complex and crocetin/K-100 inclusion complex.

Test Example 3

A pre-determined amount of the reagents listed in Table 1 were added to each of the solutions in Test Example 1, and the fading with time was compared with a non-added solution. Each of the reagents was added to a final concentration of 100 ppm. However, ferric chloride was added to a final concentration of 5 ppm. The solutions which had a 90% or higher rate of residual pigment compared to the non-added solution were marked with a (+), and those below that were marked with a (−).

The results are shown in Table 1. As is clear from the table, crocetin alone rapidly faded with sodium bisulfite, ferric chloride, sodium isoascorbate, cysteine, sodium propionate, citric acid, etc., while with the crocetin/CD inclusion complex, and particularly the crocetin/α-CD inclusion complex, crocetin/K-50 inclusion complex and crocetin/K-100 inclusion complex, the fading was considerably suppressed.

Also, in the case of crocetin alone, fading was observed with a high concentration of sodium chloride, but with crocetin/α-CD inclusion complex, crocetin/β-CD inclusion complex, crocetin/K-50 inclusion complex and crocetin/K-100 inclusion complex, the fading was considerably suppressed.

TABLE 1

|  | Crocetin | α-CD inclusion complex | β-CD inclusion complex | γ-CD inclusion complex | K-50 inclusion complex | K-100 inclusion complex |
|---|---|---|---|---|---|---|
| Non-added | + | + | + | + | + | + |
| Sodium bisulfite | − | + | − | − |  |  |
| Sodium perchlorate | + | + | + | + | + |  |
| Aluminum chloride | + | + | + | + | + |  |
| Zinc chloride | + | + | + | + | + |  |
| Copper chloride | + | + | + | + | + |  |
| Ferric chloride | − | + | − | − | + | + |
| Ascorbic acid | − | + | + | + | + | + |
| Isoascorbic acid | − | + | − | − |  |  |
| Cysteine | − | + | − | − | − | − |
| Citric acid | − | + |  |  | + | + |
| Propionic acid | + | + | + | + | + | + |
| Boric acid | + | + | + | + | + | + |
| 10% sodium chloride |  | + | + | − | + | + |

Test Example 4

The crocetin/α-, /β-, /γ-CD inclusion complex and unprocessed crocetin were each dissolved in McIlvaine buffer solutions (pH 6, 7, 8) which had been diluted to 1/10 so that the absorbance at 420 nm and 450 nm was 0.4–0.8, to prepare test solutions.

The color differences of the above mentioned test solutions were compared one hour after dissolution. The results are shown in Table 2. As is clear from the table, with the crocetin alone the b value of the color tone at pH 6.0 was lower than that at pH 7.0, thus having a weaker development of yellow color, and the color difference was 3.5, with a lighter visual appearance. However, in the case of the crocetin/CD inclusion complex, the color difference was 0.2 to 0.3, with no great change in the visual appearance.

From the above results, it is seen that the change in color tone due to pH is suppressed with crocetin/CD inclusion complex.

TABLE 2

|  | ΔE (Color difference) | | |
|---|---|---|---|
|  | pH6.0 | pH7.0 | pH8.0 |
| Crocetin | 3.5 | 0 | 0.6 |
| α-CD inclusion complex | 0.2 | 0 | 0.5 |
| β-CD inclusion complex | 0.3 | 0 | 0.5 |
| γ-CD inclusion complex | 0.7 | 0 | 0.8 |

Example 1 (Refreshment beverage)

To 100 g of sugar were added 0.2 g of citric acid, 0.05 g of malic acid and 10 cc of lemon juice, and a portion thereof prepared to 200 cc with a 1% sodium bicarbonate solution was adjusted to pH 7.0 with sodium bicarbonate, to make a juice base.

Four volumes of water was added per one volume of the juice base in which was dissolved crocetin, crocetin/α-CD inclusion complex, crocetin/K-50 inclusion complex or crocetin/K-100 inclusion complex, and the mixtures were prepared so that the absorbance at 420 nm was 0.5, and then filled into glass containers which were sealed and allowed to stand for one month in a sunny place, upon which the degree of fading thereof was compared. As a result, as shown in Table 3, the beverages colored using each of the crocetin/CD inclusion complex were more stable under light than was the one using crocetin alone.

TABLE 3

|  | Degree of fading (%) |
|---|---|
| Crocetin | 80 |
| Crocetin/α-CD inclusion complex | 30 |
| Crocetin/K-50 inclusion complex | 34 |
| Crocetin/K-100 inclusion complex | 35 |

Example 2 (Fondant)

One-half tablespoon of corn starch and one tablespoon of water were heated for dissolution, 200 g of powdered sugar was added thereto and the mixture thoroughly mixed to prepare a smooth dough. Next, a solution prepared by dissolving crocetin or crocetin/α-CD inclusion complex in 10 cc of a 1% sodium bicarbonate solution so that the absorbance at 420 nm was 2.5 was added to the above mentioned dough, and the mixture was gently heated to just the right hardness and poured onto a solid base. One product obtained in this manner was allowed to stand in a sunny place, while light was shielded from the other. As a result, when the fondant which was colored with the crocetin/α-CD inclusion complex was used, there was no visible difference between the solution kept while shielding the light and the solution kept in the sunny place, and neither underwent fading, but with the crocetin alone, the fading of the solution which was allowed to stand in the sunny place was visibly noticeable. Thus it was determined that crocetin was stabilized by forming an inclusion complex with CD.

Example 3 (Hard candy)

A complete solution of 130 g of sugar, 100 g of malt syrup, 30 cc of water and 0.4 g of citric acid was heated to 50° C. in a vacuum until it reached a sugar concentration of 97% or greater. This concentrate was heated in a boiling water bath, and when it became soft crocetin or crocetin/K-50 inclusion complex was added thereto, and the mixture was adequately mixed and poured into a mold for forming. As a result, in the case of the candy which was colored with the crocetin/K-50 inclusion complex, there was no visible difference between the solution kept while shielding the light and the one kept in a sunny place, and neither showed fading. On the other hand, in the case of the candy colored with crocetin alone, the fading of the one which was allowed to stand in a sunny place was observed to be visibly noticeable. Thus it was determined that crocetin was stabilized by forming an inclusion complex with CD.

As mentioned above, according to the present invention it is possible to impart resistance against light and various chemicals to crocetin, which is a hydrolysate of crocin, the main component of the carotenoid gardenia yellow pigment. Therefore, crocetin may be added to various food products for use as a stable colorant.

What is claimed is:

1. A crocetin-containing food or beverage colorant comprising an inclusion complex of an effective amount for coloring of a crocetin, included in a cyclodextrin, wherein the cyclodextrin is selected from the group consisting of (a) α-cyclodextrin, (b) β-cyclodextrin, (c) a mixture of α-cyclodextrin, β-cyclodextrin and γ-cyclodextrin and (d) a mixture of α-cyclodextrin, β-cyclodextrin γ-cyclodextrin and dextrin.

2. The crocetin-containing colorant according to claim 1, wherein the cyclodextrin is α-cyclodextrin.

3. The crocetin-containing colorant of claim 1, wherein the cyclodextrin is β-cyclodextrin.

4. A method of coloring a food or a beverage by adding an effective coloring amount of an inclusion complex of a crocetin and a cyclodextrin to said food.

5. The method of claim 4, wherein the cyclodextrin is α-cyclodextrin.

6. A composition comprising a food or beverage and an effective amount for coloring the food or beverage of an inclusion complex of crocetin and a cyclodextrin, wherein the cyclodextrin is selected from the group consisting of (a) α-cyclodextrin, (b) β-cyclodextrin, (c) a mixture of α-cyclodextrin, β-cyclodextrin and γ-cyclodextrin and (d) a mixture of α-cyclodextrin, β-cyclodextrin, γ-cyclodextrin and dextrin.

7. The composition of claim 6, wherein the cyclodextrin is α-cyclodextrin.

8. The composition of claim 6, wherein the food is candy.

* * * * *